(No Model.) 2 Sheets—Sheet 1.
J. N. WALLIS & D. W. SMITH.
COMBINED HORSE HAY RAKE AND TEDDER.
No. 333,366. Patented Dec. 29, 1885.
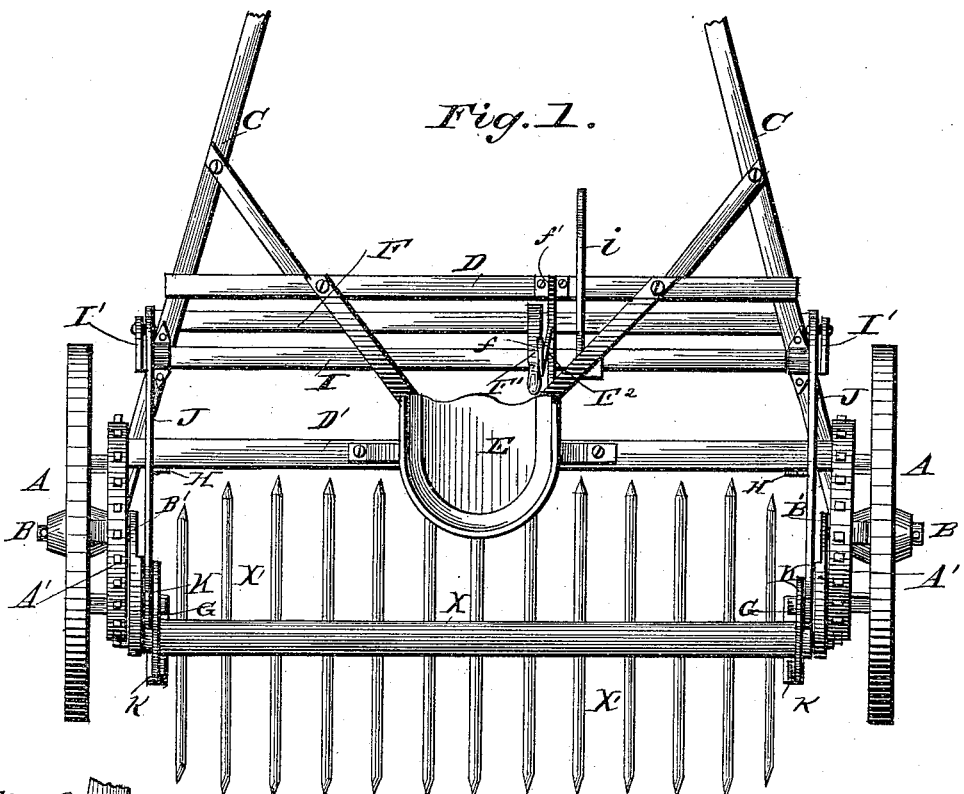
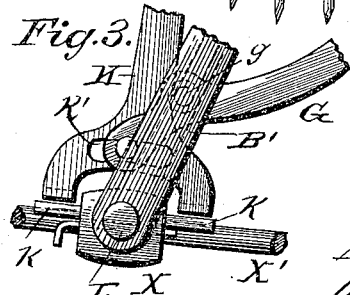
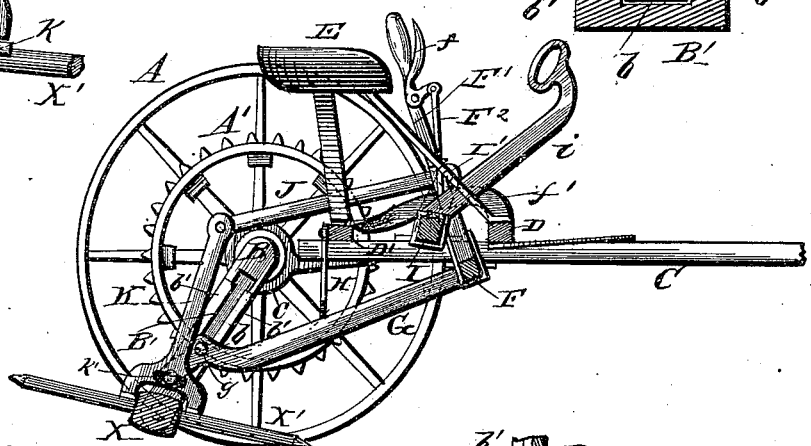
WITNESSES
Phil Dietrich
A. E. Dowell
INVENTORS
John N. Wallis
Dan'l W. Smith
by
W. Alexander Attorney

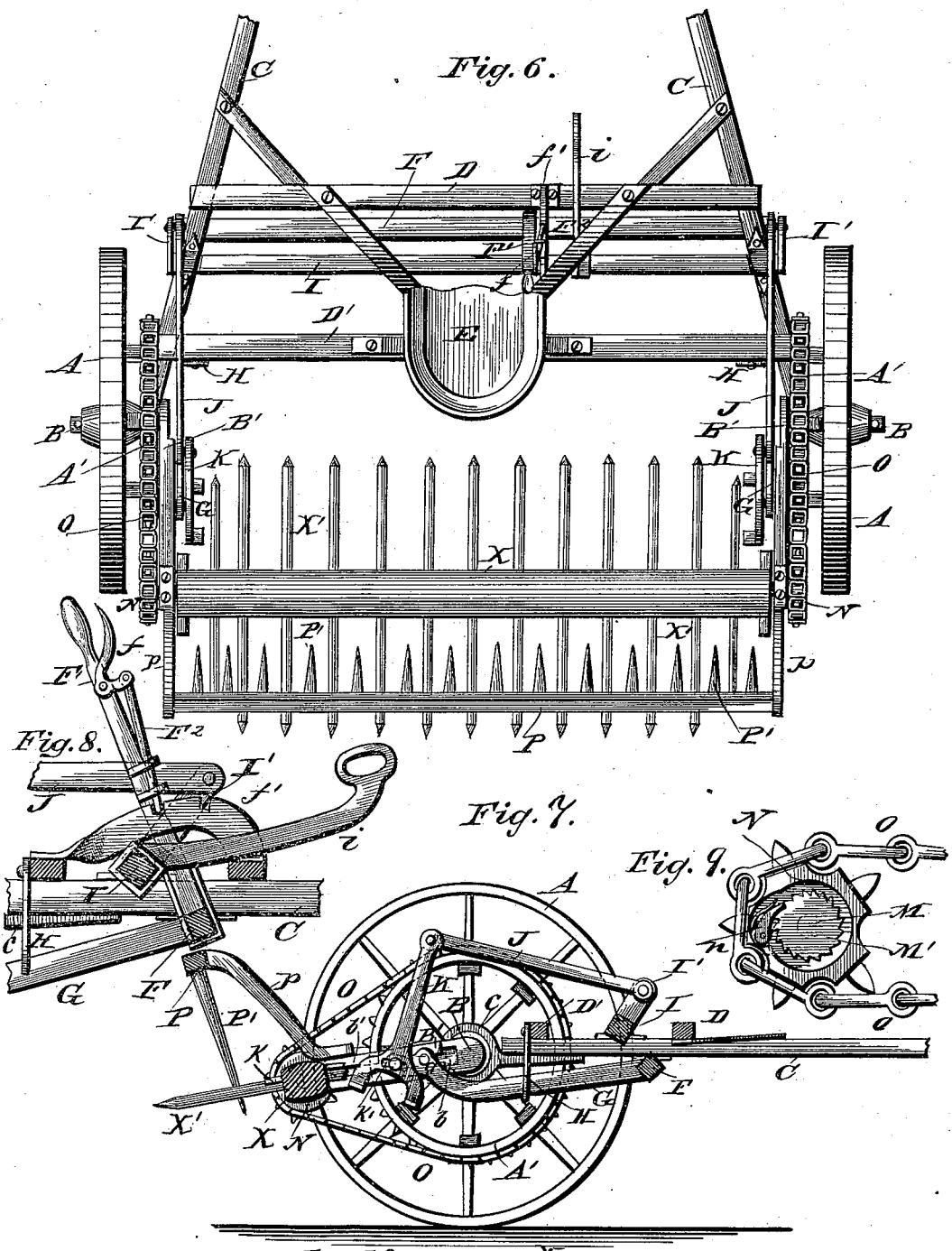

UNITED STATES PATENT OFFICE.

JOHN N. WALLIS AND DANIEL W. SMITH, OF AUBURN, NEW YORK; SAID SMITH ASSIGNOR TO SAID WALLIS.

COMBINED HORSE HAY RAKE AND TEDDER.

SPECIFICATION forming part of Letters Patent No. 333,366, dated December 29, 1885.

Application filed February 13, 1885. Serial No. 155,820. (No model.)

*To all whom it may concern:*

Be it known that we, J. N. WALLIS and D. W. SMITH, of the city of Auburn and State of New York, have invented certain new and useful Improvements in a Combined Horse Hay Rake and Tedder; and we do hereby declare that the following is a full, clear, and exact description thereof, reference being had to the accompanying drawings, and to the letters of reference marked thereon, which form part of this specification, in which—

Figure 1 is a plan view of our improved horse-rake. Fig. 2 is a central vertical section of the same. Figs. 3, 4, and 5 are details. Fig. 6 is a plan view of the machine used as a tedder. Fig. 7 is a central section of the same. Fig. 8 is a detail view of the lever mechanism for actuating the rake-head. Figs. 9 and 10 are details.
This invention relates to a combined horse hay rake and tedder, and is an improvement on a patent granted to J. N. Wallis and T. Wallis, on the 29th day of January, 1884, and numbered 292,776.
The invention consists in the novel construction and arrangement of parts, hereinafter described, and pointed out in the appended claims.

In the accompanying drawings, A A represent two transporting-wheels turning freely on the horizontal journaled front ends of two cranked axles, B B.

A' A' are two similar sprocket-wheels secured to the inner sides of the wheels A, concentric with the bearings thereof, and serving a purpose hereinafter explained. The crank-arms B' of the axles B have bearings at their ends for the journals of the rake-head X, and are provided on their inner surfaces with longitudinal grooves *b*, made T-shaped in section by overlying strips *b'*, as shown.

X' are the rake-teeth arranged on the rake-head in two diametrically-opposite rows.

C C are the thills, the thill-irons *c* of which have their rear ends formed into bearings in which the crank-axles turn, or, if preferred, the inner ends of the hubs of the wheels A may turn therein. The thills are connected together in front of the axles by the transverse bars D D', on which is mounted by means of supporting-rods the driver's seat E.

F is a transverse shaft turning in bearings secured to the under surfaces of the thills to the rear of the bar D, and F' is a lever to rotate the shaft, rising therefrom, within easy reach from the driver's seat.

F² is a detent-bar moving in staples on the side of the lever F', and actuated by the handle *f*, pivoted to the said lever. The point of the detent-bar enters the notches of the curved rack-bar *f'*, secured by its ends to the bars D D', and holds the shaft F in any desired position.

G G are arms secured to and extending backward from the ends of the shaft F, and having their rear ends curved upward; and *g g* are pins extending outward from their rear ends and entering the grooves *b*. The pins have rectangular heads on their outer ends, by means of which and the strips *b'* they are retained in the grooves. By means of the described shaft, lever, and arms the crank-arms B', and consequently the rake, may be raised or lowered. To retain the rake in an elevated position, hooks H are pivoted to the cross-bar D' and arranged to engage with the lower edges of the arms G and take all strain from said arms.

I is a transverse shaft turning in bearings on the upper surfaces of the thills between the cross-bars D and D', and provided with the lever *i*, by means of which it is rotated, and I' I' are short arms standing at right angles to the ends thereof.

J J are link-bars, having their front and rear ends pivoted, respectively, to the ends of the arms I' and the ends of the tilting-levers K. The said levers are forked at their lower ends, and the arms of each fork are bent at right angles inward, and rest, when the crank-arms B' are depressed, upon diametrically-opposite lugs *k k*, standing from one end of the rake-head to the inner side of the bearing thereof.

*k' k'* are curved transverse slots in the levers K at the bases of their forks, through which slots pivot-pins secured to the arms G pass. The tilting-levers tend to keep the points of the front rake-teeth depressed. By drawing the lever *i* toward himself the driver can tilt the forward teeth of the rake upward, so as to pass over stones or other obstructions. In doing this the short arms I' rock rearward, the links J move rearward, causing the upper ends of the tilting-levers K to move rearward also, and as the said levers turn on the pins $k'$ as pivots, the rear arms of the forks press down on the rear lugs, $k$, on the rake-head and cause the latter to rock rearward, elevating the front teeth.

To dump, the rake is elevated by the described means and then rotates backward, casting off its load, and the rear teeth come to the front. The tilting-levers, being pivoted on the arms G, then assume the position shown in Fig. 7.

L L are cap sleeve-covered bolts which are secured in the ends of the rake-head, and the sleeves of which form journals for the same when the machine is used as a rake. The sleeves that form the journals of the rake-head are permanently secured within openings in the ends thereof.

M M are bolts or bars which replace the bolts or bars L L when the machine is used as a tedder, and M' M' are ratchet-wheels secured to the outer ends thereof.

N N are sprocket-wheels turning by sufficient pressure on the bolts M, and chambered on their outer surfaces for the accommodation of the ratchet-wheels. $n\, n$ are pawls pivoted to the sprocket-wheels and controlling the ratchet-wheels.

O O are chains connecting the sprocket-wheels A' with the sprocket-wheels N, and thereby rotating the rake by the motion of the transporting-wheels A. The ratchet wheels and pawls are so arranged as to allow the bearings of the rake to turn in the sprocket-wheels N in the direction to move the lower set of rake-teeth backward.

P is a transverse bar having its ends secured to the crank-arms B' by the rods $p$, and provided with the downwardly-inclined cleaning-teeth P', between which the rake-teeth pass as they revolve.

In using a machine as a rake the chains O, sprocket-wheels N, bar P, and bolts M are detached, the bolts L secured in place and the crank-arms B are allowed to drop. The rake then assumes the position shown in Fig. 2, and is tripped, as hereinbefore described.

In using the machine as a tedder the chains, sprocket-wheels, and ratchet-wheels are put in place and the rake-head raised, as described. The rotation of the transporting-wheels then rotates the rakes. Should it be desired to turn the machine when the points of the rake-teeth are on the ground, the bearings of the rake-head will turn in the sprocket-wheels and continue uniformly the rotation of the rake, notwithstanding the different rates of speed of the transporting-wheels. The teeth P prevent the hay from winding on the rake-teeth.

The sprocket-wheels, driving-chain, frame P, and teeth P', relating to a tedder only, we reserve for a future application, in which they will be claimed, in combination with such parts as are necessary for their operation.

Having described our invention, we claim—

1. The combination, with the crank-axles, the thills, and transporting-wheels having bearings thereon, and the rotating head-bar X, provided with the teeth X', and having bearings in the rear ends of the crank-axle arms, of the shaft F, provided with the lever F', and arms G, having near their ends pins $g$, which slide in grooves $b$ in the crank-axle arms and raise the tedder when the arm is moved outward, substantially as specified.

2. The combination of the crank-axle, the rake having its central bar or head pivoted upon the ends of the arms of the crank-axles, and the mechanism, substantially as described, whereby the rake may be raised to work as a tedder, with the bar P, secured by the rods $p$ to the arms of the crank-axles, and the teeth P' upon the bar P, arranged to clear the rake-teeth as the latter rotate, substantially as specified.

In testimony that we claim the foregoing as our own we affix our signatures in presence of two witnesses.

JOHN N. WALLIS.
DANIEL W. SMITH.

Witnesses:
FREDERICK I. ALLEN,
GEORGE UNDERWOOD.